United States Patent
Battlogg et al.

(10) Patent No.: US 8,561,764 B2
(45) Date of Patent: Oct. 22, 2013

(54) DAMPING DEVICE FOR A TWO-WHEELED VEHICLE

(75) Inventors: Stefan Battlogg, St. Anton (AT); Jürgen Pösel, Bludenz (AT); Gernot Elsensohn, St. Anton (AT); Martin Walhert, Aarberg (CH)

(73) Assignee: DT Swiss Inc., Grand Junction, CO (US)

( * ) Notice: Subject to any disclaimer, the term of this patent is extended or adjusted under 35 U.S.C. 154(b) by 302 days.

(21) Appl. No.: 12/839,675

(22) Filed: Jul. 20, 2010

(65) Prior Publication Data
US 2011/0031075 A1 Feb. 10, 2011

(30) Foreign Application Priority Data

Jul. 21, 2009 (DE) .................. 10 2009 034 296

(51) Int. Cl.
*F16F 9/53* (2006.01)
*F16F 15/03* (2006.01)

(52) U.S. Cl.
USPC ............... 188/267.2; 188/266.2; 188/267; 188/282.8

(58) Field of Classification Search
CPC ............................. F16F 9/53; F16F 15/03
USPC ............ 188/267, 267.2, 270, 322.15, 322.22
See application file for complete search history.

(56) References Cited

U.S. PATENT DOCUMENTS

| | | | |
|---|---|---|---|
| 5,632,361 A | 5/1997 | Wulff et al. | |
| 5,718,418 A * | 2/1998 | Gugsch | 267/140.14 |
| 5,947,238 A * | 9/1999 | Jolly et al. | 188/267.2 |
| 6,019,392 A | 2/2000 | Karlow | |
| 6,129,185 A * | 10/2000 | Osterberg et al. | 188/267.2 |
| 6,131,709 A | 10/2000 | Jolly et al. | |
| 6,260,676 B1 | 7/2001 | Agnihotri et al. | |
| 6,471,018 B1 | 10/2002 | Gordaninejad et al. | |
| 6,896,109 B2 * | 5/2005 | Kelso et al. | 188/267.1 |
| 7,011,191 B2 * | 3/2006 | Spicer et al. | 188/267 |
| 7,066,310 B2 * | 6/2006 | Mintgen et al. | 188/322.22 |
| 7,445,094 B1 * | 11/2008 | Henderson et al. | 188/267 |
| 7,806,390 B2 | 10/2010 | Achenbach | |
| 7,900,754 B2 * | 3/2011 | Carlson | 188/267 |
| 8,104,591 B2 * | 1/2012 | Barefoot | 188/267.2 |
| 8,240,440 B2 * | 8/2012 | Massmann et al. | 188/322.15 |

(Continued)

FOREIGN PATENT DOCUMENTS

| | | |
|---|---|---|
| DE | 32 02 152 | 8/1983 |
| DE | 103 37 516 | 3/2005 |

*Primary Examiner* — Thomas Irvin
(74) *Attorney, Agent, or Firm* — Greer, Burns & Crain, Ltd.

(57) ABSTRACT

A damping device for a two-wheeled vehicle having a first and a second damper chamber which are coupled to one another through a flow connection. The flow connection includes at least one flow valve provided with a damping channel. A magneto-rheological fluid is provided in the damping channel of the flow valve wherein the flow valve includes at least one magnetic device such that the damping channel of the flow valve can be exposed to a magnetic field of the magnetic device. The flow valve further includes at least one spring device. The magnetic device of the flow valve is provided on a valve piston and the valve piston is received in a deflection chamber to resiliently deflect counter to a spring force of the spring device such that the magnetic field of the magnetic device effective in the damping channel depends on the resilient deflection of the valve piston.

20 Claims, 4 Drawing Sheets

(56) References Cited

U.S. PATENT DOCUMENTS

| | | | |
|---|---|---|---|
| 2004/0226788 A1* | 11/2004 | Tanner | 188/267.1 |
| 2005/0150731 A1 | 7/2005 | Hitchcock et al. | |
| 2005/0216098 A1* | 9/2005 | Christensen | 623/56 |
| 2007/0267258 A1* | 11/2007 | Massmann et al. | 188/316 |
| 2008/0053763 A1* | 3/2008 | Wereley et al. | 188/267.2 |
| 2008/0060710 A1 | 3/2008 | Carlson et al. | |
| 2010/0089711 A1* | 4/2010 | Nehl et al. | 188/267.2 |
| 2010/0193304 A1 | 8/2010 | Bose et al. | |

\* cited by examiner

DAMPING DEVICE FOR A TWO-WHEELED VEHICLE

The present invention relates to a damping device for a two-wheeled vehicle and in particular for a bicycle, such as a rear wheel damper or a suspension fork. These two-wheeled vehicles may be human-powered or else motor- or engine-powered or be equipped as a bicycle with an auxiliary drive.

Many different types of rear wheel dampers and suspension forks for two-wheeled vehicles have become known in the prior art. Typically a damping unit for a rear wheel of a bicycle comprises at least one spring for cushioning shocks, and a damper for damping spring vibrations.

Dampers for two-wheeled vehicles tend to be operated with a damping fluid such as oil. For damping, the damping fluid is conveyed from a first damping chamber to a second damping chamber through a flow valve throttling the flow by means of e.g. a valve gate. The size of the valve gate aperture determines the damping strength. For application in bicycles it is desirable to have a load-sensitive damping level regulation. Thus for example slight damping may be provided for weak shocks and stronger damping for heavy shocks.

For optimal response a zero passage of the force-velocity progression is required such that no force will be generated while the piston is inactive. A zero passage of the characteristic curve of the damper is required for a homogeneous transition from the compression to the rebound stage.

Therefore it is the object of the present invention to provide a damper for a two-wheeled vehicle which allows a zero passage of the characteristic curve and in which load-sensitive adjustment of the damping level is possible.

The damping device according to the invention for a two-wheeled vehicle and in particular for a bicycle comprises at least one first damper chamber and at least one second damper chamber coupled to one another through at least one flow connection or a flow channel. The flow connection comprises at least one flow valve provided with at least one damping channel. A magneto-rheological fluid is provided at least in the damping channel of the flow valve. The flow valve furthermore comprises at least one magnetic device. The or at least one damping channel of the flow valve can at least in part be exposed to a magnetic field of the magnetic device. The flow valve furthermore comprises at least one spring device and the magnetic device of the flow valve is provided on a valve piston of the flow valve. The valve piston is received in a deflection chamber to resiliently deflect counter to a spring force of the spring device such that the magnetic field of the magnetic device effective in the damping channel depends on the resilient deflection of the valve piston.

The damping device according to the invention has many advantages. One considerable advantage of the damping device according to the invention is the valve piston resiliently deflecting counter to a spring force, comprising at least one magnetic device. As the valve piston deflects counter to the spring force of the spring device then the magnetic field generated in the damping channel by the magnetic device will change. In this way the viscosity of the magneto-rheological fluid in the damping channel changes such that the damping properties of the damping device will change correspondingly.

A magnetic device in the sense of the present application is a device that generates a magnetic field. Therefore the magnetic device may be referred to as a magnetic field-generating device. Preferably the magnetic device is configured as a permanent magnet or comprises at least one permanent magnet that substantially generates the magnetic field. It is also possible to employ an electromagnet.

As the magnetic field that was generated in the damping channel which may for example be configured as a damping gap, is amplified by way of displacement of the valve piston, then the amplified magnetic field will increase the chaining strength of the particles in the magneto-rheological fluid which will thus have a correspondingly higher viscosity. In this way the flow resistance of the magneto-rheological fluid through the damping channel will change thus generating an increased damping level.

As the valve piston returns in the opposite direction, the magnetic field generated by the magnetic device will again change correspondingly and the damping channel is again exposed to the original magnetic field. The magnetic field strength in the damping channel can increase or else decrease due to the valve piston deflection.

What is in particular possible is a deflection of the valve piston in different directions for the rebound stage and the compression stage.

The flow valve may comprise a valve body in which the valve piston is received and controlled. The damping channel may be provided inside the valve body or external around the valve body.

The first damper chamber is coupled with the second damper chamber through the flow connection. This means that a connection by pressure of the first damper chamber with the second damper chamber is in particular present through the flow connection such that a pressure increase in the first damper chamber will influence the second damper chamber through the flow connection. The flow connection is particularly preferably configured as a fluid connection such that the magneto-rheological fluid is provided not only in the area of the damping channel but likewise in the area of the flow connection and in the first and second damper chambers.

This magneto-rheological fluid may consist e.g. at least in part of carbonyl ferrous particles finely dispersed in a carrier medium such as oil, wherein various additives may be contained in the fluid to prevent corrosion, abrasion, and sedimentation, or to increase service life, or which serve as frost or heat protection, or the like.

The magnetic field of the magnetic device allows to subject at least part of the damping channel to a magnetic field.

The valve piston which may be called a magnetic piston comprises the magnetic device and is preferably received in the housing or valve body of the flow valve to be slidable piston-like.

Preferably the magnetic field of the magnetic device present in the damping channel is larger in at least one deflected position of the valve piston than in a normal position of the magnetic device. This means that in the normal position of the magnetic device the viscosity in the damping channel is lower than in at least one deflected position such that as deflection increases, the damping level will increase.

Preferably the magnetic field of the magnetic device is magnetically short-circuited substantially at the magnetic device itself at least in the normal position. This may occur by means of a magnetic conductor connecting the north pole to the south pole immediately at the magnetic device. In this way the magnetic field of the magnetic device that is in particular configured as a permanent magnet is neutralized or at least reduced in the damping channel since the highest field density is present in the magnetic conductor generating the magnetic short-circuit.

Preferably the flow connection comprises at least one flow channel passing external of the valve piston wherein particularly preferably no flow and damping channel passes through the valve piston itself. This causes a spatial separation between the valve piston control and the resulting damping control.

Other configurations may provide for at least one flow connection and/or at least one damping channel to pass through the valve piston.

Preferably one first valve piston side is provided with a first acting space and a second valve piston side, with a second acting space. Said first acting space is preferably coupled with the first damper chamber and the second acting space, preferably with the second damper chamber. A flow connection exists in particular between the first acting space and the first damper chamber, and between the second acting space and the second damper chamber. By means of a flow connection between the acting spaces and the respective associated damper chambers the pressure present in the damper chamber can be transferred immediately to the acting space and thus to the valve piston. In a simple, preferred embodiment the first and second acting spaces are received on a hollow cylindrical portion of the flow valve and are separated from one another by means of the valve piston disposed displaceably over the hollow cylindrical portion.

Advantageously a deflection force on the valve piston is dependent on a differential pressure of the fluid in the first and second acting spaces. In particular does the deflection force on the valve piston increase as the differential pressure increases such that as the differential pressure increases, the deflection force will increase and so will the achieved deflection of the valve piston. In this way the magnetic field effective in the damping channel will likewise change accordingly.

Through the configuration of the flow connection the dependence of the deflection force on various pressure components such as velocity-related dynamic pressure, absolute pressure, or differential pressure can be set. Moreover the speed of response to pressure changes can be varied. By means of relatively small cross-sections in the flow connections for example the response speed can be reduced. It is likewise possible for the flow connection to be at least partially closed by a check valve to obtain a response speed dependent on the direction of movement.

In all of the configurations it is preferred for the two damper chambers to be located in a damper and separated from one another by a damper piston.

Advantageously the damping device according to the invention comprises a spring device which may be configured as a pneumatic spring, air spring, coil spring, elastomer spring, or the like, and which serves to cushion shocks. The spring device may be immediately coupled with the damper.

In preferred configurations the valve piston is located in the damper piston. This means that the valve piston is positioned in the damper piston displaceable relative to the damper piston to deflect by way of the valve piston the magnetic device or the permanent magnet or the permanent magnets of the valve piston related to the operating condition. This configuration allows a particularly compact structure. It is likewise possible for the flow valve to be provided external of the damper, externally connecting the two damper chambers with one another.

The valve piston is preferably received axially displaceably on the flow valve and the magnetic device comprises at one of its axial ends the north pole and at its other axial end, the south pole.

The first acting space is in particular provided on a first internal recess and the second acting space, on a second internal recess of the flow valve wherein the valve piston is preferably axially displaceable at least over a portion of the first internal recess and the second internal recess. The acting spaces are preferably sealed from one another through the magnetic field of the permanent magnet.

Preferably the spring device is positioned in at least one acting space, urging the valve piston to return from its deflected position to the normal position.

In the normal position preferably no spring force of the spring device acts on the valve piston. To this end, an abutment may be provided on which the spring device exerts pressure in the normal position of the valve piston. This means that in the normal position the valve piston is not loaded by the spring device. The abutment may be configured to be adjustable.

Preferably at least one spring device is provided for the rebound stage and at least one spring device, for the compression stage. The two spring devices may act on the valve piston from the same side or from opposite sides.

If abutments are attributed to both of the spring devices then no spring forces act on the valve piston in the normal position. This configuration allows to provide different spring rigidities for the spring device on the first side in the first acting space and the spring device on the other, second side in the second acting space. In this way different spring strengths for the compression stage and for the rebound stage are possible. By means of selecting suitable spring devices, suitable positioning of the abutments, and selecting a proper magnetic device and by means of a suitable configuration of the damping channels the progression of the characteristic damper curve can be set as desired.

To be able to set or adjust the damping properties of the damping device, a control rod may be provided for setting the characteristic curve of at least one spring device. It is conceivable to influence by means of the control rod a position of an abutment and/or a cross-section of a damping channel or another gate.

Preferably the first acting space and the second acting space are delimited by an inner pipe which inner pipe is configured in the area of the magnetic device of the valve piston to be magnetically conducting in the normal position, while the inner pipes are formed at the axial ends of the magnetic device by a magnetic insulation layer which in turn is followed by magnetically conducting areas in both axial directions.

This configuration will cause magnetic short-circuiting of the magnetic device in the normal position. The inner pipe configured magnetically conducting at or else in the vicinity of the magnetic device causes a magnetic short-circuit of the magnetic device in the normal position such that only a minor portion of the magnetic field of the magnetic device is positioned external of the magnetic device. An axial displacement of the magnetic device then causes the magnetic short-circuit of the magnetic device to be increasingly neutralized with increasing deflection such that a considerable portion of the magnetic field forms external of the inner pipe.

In specific configurations the inner pipe is surrounded by a magnetic insulator and a magnetically conducting outer pipe. It is preferred for the damping channel to bypass one axial end of the inner pipe. In particular is the damping channel oriented radially or approximately radially in the area of the axial end of the inner pipe. The damping channel extends in particular approximately perpendicular to the magnetic field emerging from the axial end of the inner pipe, traversing the damping channel or the damping gap and entering the outer pipe where the magnetic field is guided toward another axial end where it is guided back into the inner pipe through a second damping channel so as to generate a closed magnetic field.

In other configurations the inner pipe may again be surrounded by a magnetic insulator and a magnetically conducting outer pipe. An axial damping gap is located radially externally of the inner pipe or it surrounds the entire inner pipe in the radial direction. Then a magnetic insulator surrounding the inner pipe can be dispensed with. The damping channel axially bypasses at least a portion of the axial length of the inner pipe. To increase the damping level the magnetic field extends radially or at least partially radially through the axial damping gap where it causes chaining in the magnetorheological fluid so as to damp the flow through the damping channel. The magnetic field is closed by an outer pipe which may be formed e.g. by the damper piston.

Different shapes of the characteristic damper curve can be realized easily. Thus for example a force decreasing with increasing valve piston deflection may be realized as well. To this end the structure of the inner pipe of magnetically conducting and non-conducting segments is adapted to generate the desired magnetic progression.

In all of the configurations it is conceivable to provide a mechanical control valve which opens as a predetermined pressure is exceeded to offer an additional flow aperture in the rebound stage and/or in the compression stage as a predetermined pressure is exceeded.

A mechanical control valve is in particular configured as a shim valve comprising in particular a plurality of thin plates. This shim valve leads to an conveniently flattened response curve of the damping device so as to provide a corresponding damping level in the case that high forces occur.

In all of the configurations it is preferred for at least one heat pipe device with at least one heat pipe to be provided for emitting the heat generated in damping.

A cooling device may be provided comprising the heat pipe, a convector unit, and a reflux device wherein the convector unit absorbs the heat generated in damping, transfers it and emits it into the ambience. The reflux device causes the condensed heat medium to return to transport the condensed heat medium back to the vicinity of the damping aperture to the damping channel. The reflux device may be formed by a wire mesh section to transport the condensed fluid back after condensation by way of capillary forces even counter to gravitation.

The heat pipe of the heat pipe device is filled with such a heat medium such that the heat medium in the heat pipe is present substantially in a vapor state and substantially in a liquid state at least given a temperature between 20° and 60°.

Other advantages and characteristics of the present invention can be taken from the exemplary embodiment which will be described below with reference to the accompanying FIGS. 1 to 4.

With reference to the enclosed figures, embodiments of damping devices 1 according to the invention will now be described.

Figure 1:
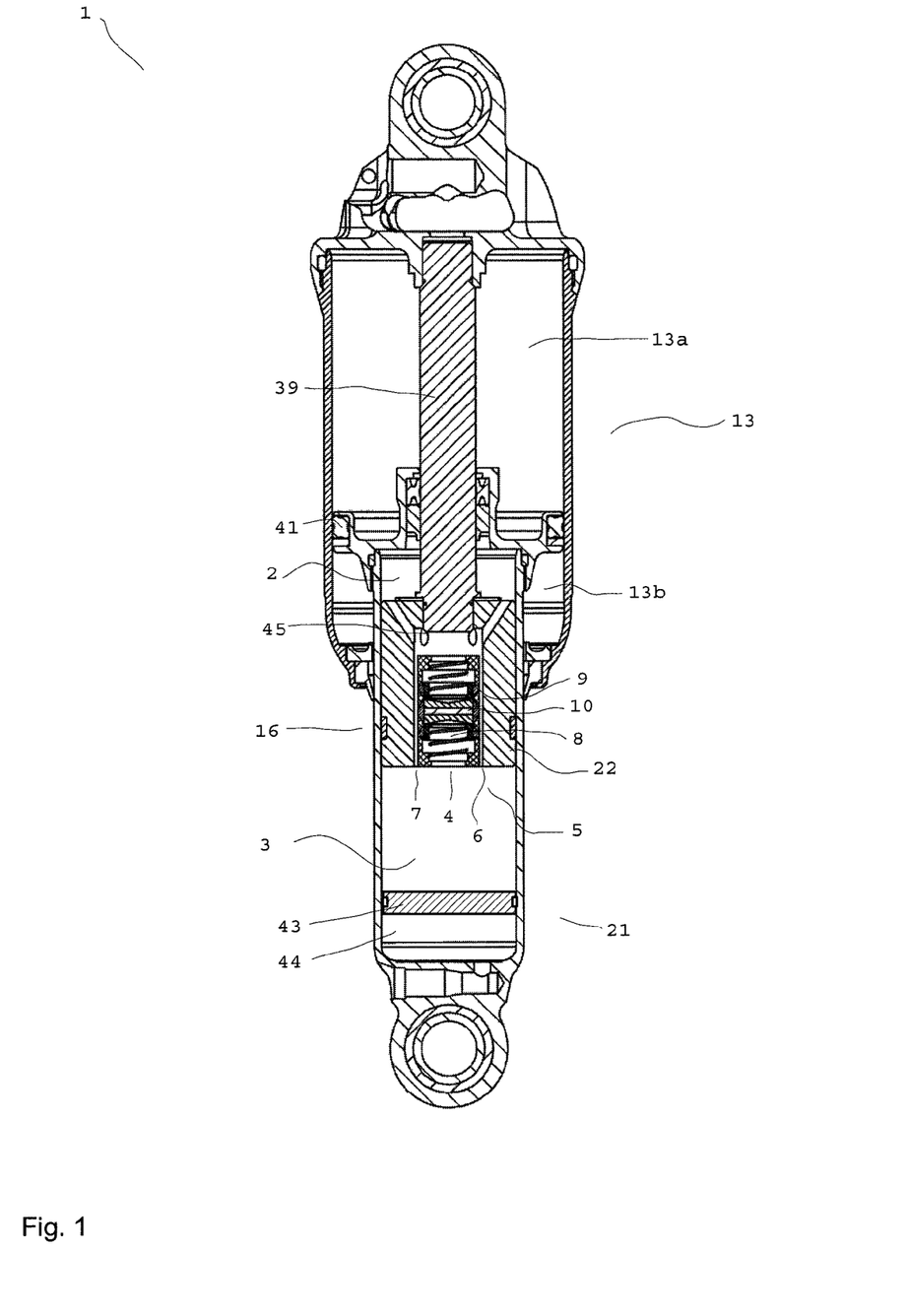
FIG. 1 a schematic sectional side view of a damping device according to the invention in the normal position.

The damping device 1 according to FIG. 1 comprises a damper 21 with a first damper chamber 2 and a second damper chamber 3, which are presently separated from one another by the damper piston 22 of the damper 21. The damper piston 22 is connected with the piston rod 39.

A differential spring 44 is provided at the damper chamber 3 separated from the damper chamber 3 by a differential piston 43. The differential spring 44 balances the total volume of the damper chambers 2 and 3 that is reduced by the immersing piston rod 39.

A flow connection 4 between the first damper chamber 2 and the second damper chamber 3 is presently provided through the passage 45 and the flow valve 5. The damping fluid and thus the flow through is influenced by the flow valve 5.

In the top area a spring 13 configured as a pneumatic spring is provided comprising spring chambers 13*a* and 13*b* separated from one another by a gas piston 41.

The flow connection 4 between the damper chambers 2 and 3 is presently provided through the damping channels 6 and 7 of the flow valve 4.

Figure 2:
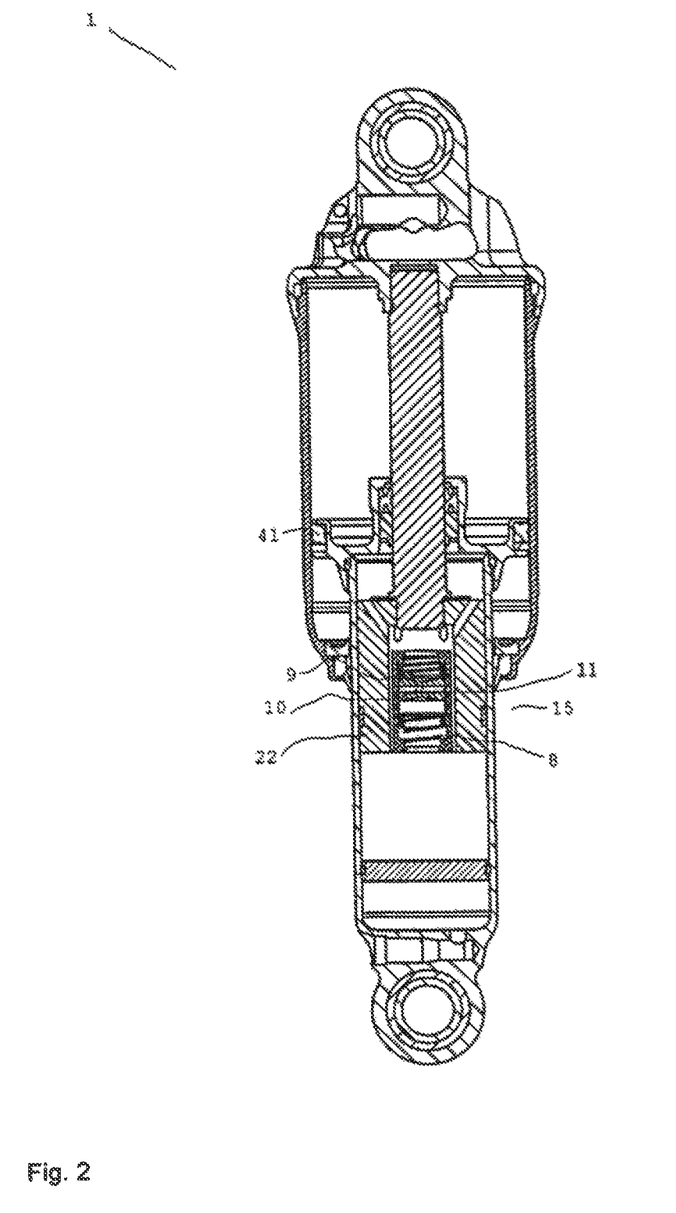
FIG. 2 a sectional side view of the damping device according to FIG. 1 in the compression stage.

In case that a heavy shock occurs the damper 21 illustrated in FIG. 1 is transferred to the state illustrated in FIG. 2 in which the flow valve 5 is in the stage of compression stage damping. The magnetic device is presently configured as a permanent magnet 10 and is deflected upwardly counter to the spring force of the spring device 9 presently configured as a coil spring.

Figure 3:
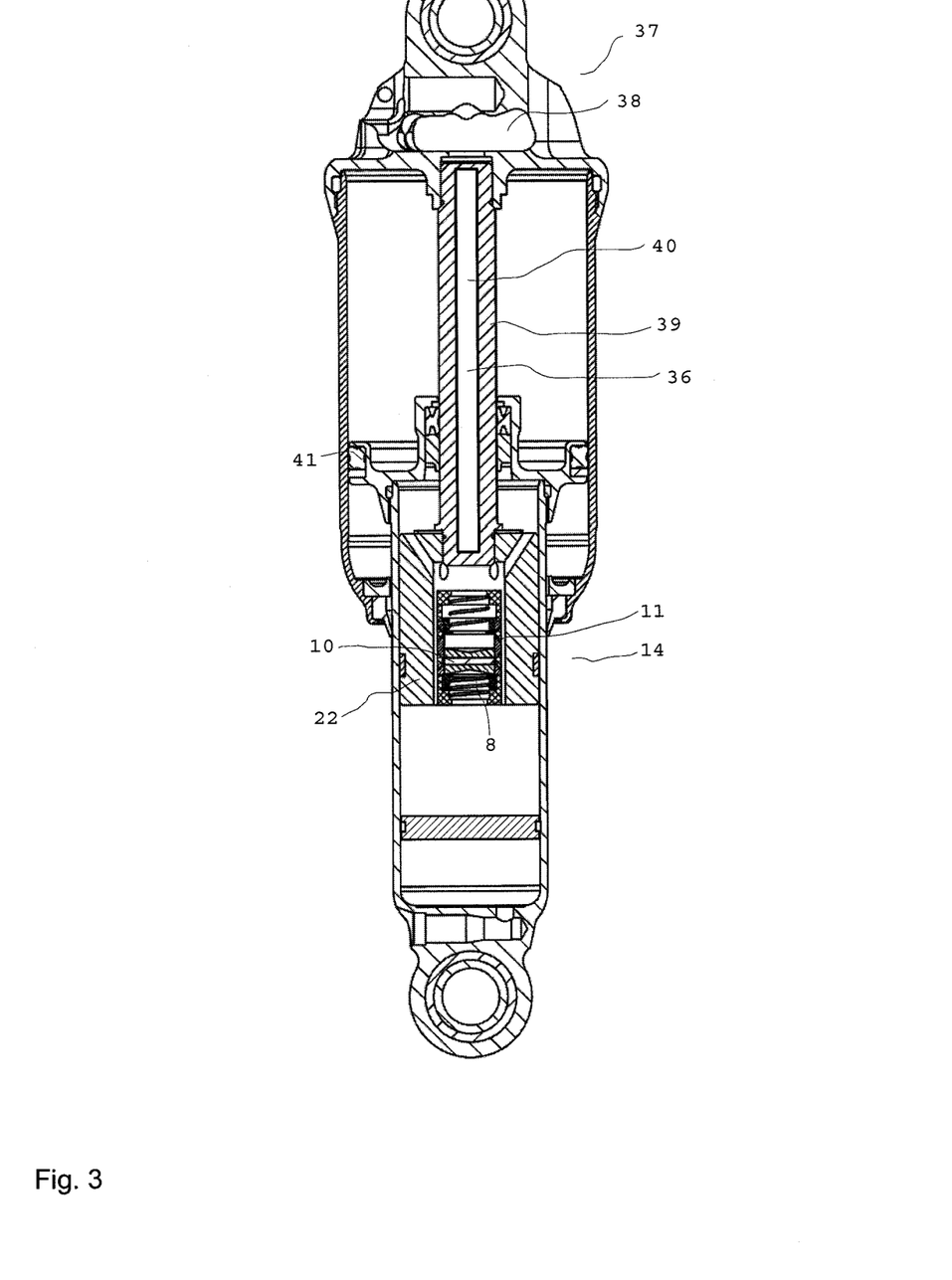
FIG. 3 a slight variation of the damping device according to FIG. 1 in the rebound stage.

As shown in FIG. 3, the permanent magnet 10 of the valve piston 11 of the flow valve 5 is deflected downwardly in the rebound stage counter to the spring force of the spring device 8.

The embodiment according to FIG. 3 shows a variant in which a control rod may be provided on or incorporated into the piston rod 39. Presently the piston rod 39 is provided with the heat pipe 40 which quickly and reliably conveys out of the damper 21 the heat generated in damping with a slight temperature gradient only. To this end one top end of the heat pipe may be provided with a convector unit 38 having for example cooling fins to effectively emit to the ambience the heat absorbed from the heat pipe.

Otherwise the embodiment according to FIG. 3 corresponds to the embodiment according to FIGS. 1 and 2, FIG. 3 showing the deflected position 14 of the rebound stage.

Figure 4:
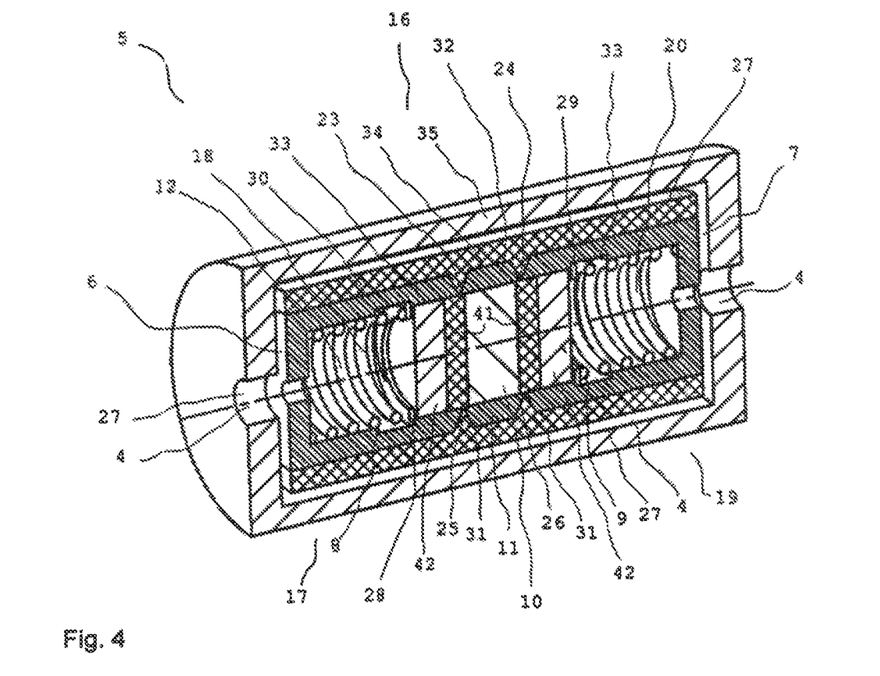
FIG. 4 an enlarged, schematic illustration of another flow valve for a damping device.
Figure 5:
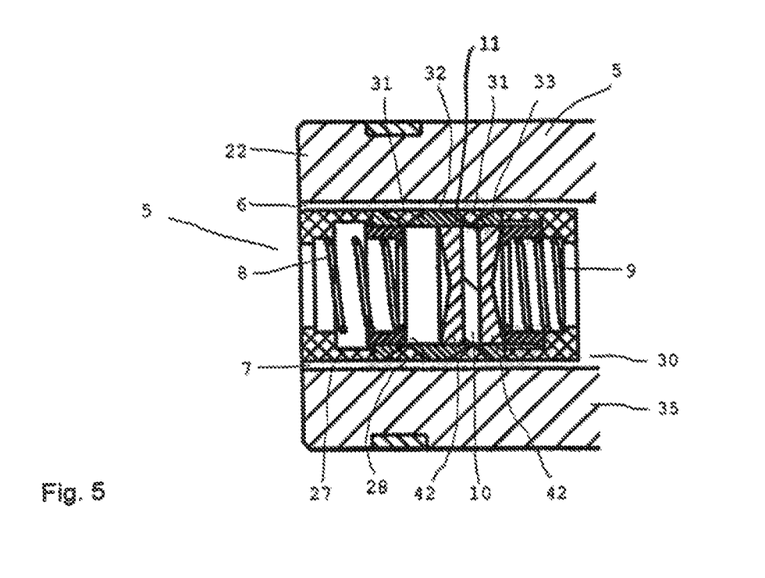
FIG. 5 an enlarged, schematic illustration of the flow valve of the damping device according to FIG. 1 in the compression stage.

The FIGS. 4 and 5 show two different flow valves 5 both of which can in principle be employed with a damping device 1 according to the invention. FIG. 4 shows a variant of a flow valve 5 while FIG. 5 shows the configuration of the flow valve 5 present in FIGS. 1 to 3. With an adaptation of the damper piston 22 the flow valve 5 according to FIG. 4 may be employed as well.

The flow valves in the FIGS. 4 and 5 each provide a flow connection 4 through the flow channels 27 and the damping channels 6 and 7 which damping channels 6 and 7 extend radially inwardly from the outside at the axially spaced-apart end portions in FIG. 4 in the present embodiment such that the damping fluid can be transferred through the central apertures of the flow connection 4 from the first damper chamber 2 through the flow valve 5 into the second damper chamber 3. In the embodiment according to FIG. 5, however, the damping channels 6 and 7 extend in the axial direction.

The flow valve 5 shown in FIG. 4 comprises an inner pipe 30 which, other than in the axial end areas of the permanent magnet 10, consists of a magnetically conducting material. The north pole 25 and the south pole 26 respectively are located at the axial ends 23 and 24 of the permanent magnet 10, and magnetic insulation layers 31 are located in the area of the inner pipe 30.

Since both the north pole 25 and the south pole 26 are covered by the magnetically conducting area 32 of the inner pipe 30 at the permanent magnet 10, the magnetic field of the permanent magnet 10 is substantially magnetically short-circuited in the normal position 16 shown in FIG. 5 such that the magnetic field lines are located virtually only within the conducting area 32 of the inner pipe 30.

When the permanent magnet 10 is deflected from its normal position 16 in an axial direction (to the right or left) then, as deflection increases the portion of the magnetic short-circuit is reduced in the conducting area 32 while simultaneously an increasing portion of the magnetic field extends through the conducting area 33 of the inner pipe in the axial direction. At the axial ends the magnetic field emerges from the inner pipe 30 in the axial direction and traverses the damping channels 6 and 7 which presently extend approximately in the radial direction. Due to the increasing field strength the magneto-rheological fluid in the damping channels 6 and 7 forms chains, thus increasing in viscosity in particular in the direction of the damping channels 6 and 7 to thus result in a higher damping level.

A deflection of the permanent magnet 10 in the direction of the first side 17 towards the first acting space 18 may only occur counter to the force of the spring device 8 presently configured as a coil spring while the second spring device 9 configured as a coil spring is urged against the abutment 29 provided shortly in front of the normal position of the permanent magnet 10 and thus of the valve piston 11.

Reversely, when a deflection force is generated in the direction of the second side 19 towards the second acting space 20 then the valve piston 11 with the permanent magnet 10 is moved counter to the spring force of the second spring device 9, wherein as in a movement in the other direction, the magnetic field in the damping channels 6 and 7 increases correspondingly.

Presently by means of the inner pipe 30 which is radially separated from the inner pipe by means of a magnetic insulator layer 34 a magnetically closed field is generated which causes the damping level to increase in the damping channels 6 and 7 corresponding to the magnetic field strength.

On the whole the invention provides a damper 21 that may be employed both as a rear wheel damper and as a suspension fork component and may effectively serve to damp weak and heavy shocks.

By means of selecting suitable spring devices 8 and 9 and spring strengths, and by means of the permanent magnet strength and its adjustment, an effective damper system for a bicycle may be provided which in simple cases operates without any adjusting members. This is very advantageous since with the quantity of adjusting members increasing the risk of wrong settings and maladjustment will increase which may lead to undesirable spring and damping properties. Adjusting members for setting the spring strength may be provided optionally though for adjusting the damper e.g. to the rider's weight.

On the whole an axially displaceable "magnetic piston", i.e. a ferromagnetic piston 11 having a center permanent magnet 10 is held in the center position or normal position 16 relative to a coil spring 8, 9 located to its left and right.

When pressure is applied on one side of the piston or valve piston 11 by way of a damper movement (pressure times area=force), then the piston 11 is displaced a few millimeters counter to the spring force of the spring 8, 9.

Resulting from the piston displacement the flow of the magnetic field lines will change.

In the center or normal position 16 the magnetic field lines of the hard magnet 10 configured as a permanent magnet quasi flow in a magnetic "short-circuit" through the sleeve pipe portion or the inner pipe 30 immediately adjacent to the piston 11. The axially extending gap or flow channel 27 located above, through which the magneto-rheological fluid (MRF) flows, is only exposed to a small residue magnetism (stray field).

When the valve or magnetic piston 11 is axially displaced into a deflected (eccentric) position 14 or 15, then the field will increasingly close across the axially extending gap or flow channel 27 through which the magneto-rheological fluid flows, and the ferromagnetic cylinder pipe or outer pipe 35 lying above.

The magnetic circle closes across the MRF gap or damping channels 6 and 7 provided at the front faces between the outer and the inner pipes.

The magnetic flow in the damping channel 6, 7 or MRF gap results in a magneto-rheological effect (MRF effect) involving the forming of a carbonyl ferrous particle chain which actually causes an increase in the fluid viscosity and thus a pressure increase or force increase.

The pressure on the magnetic or valve piston 11 depends on the displacement speed.

Pressure may be exerted on the system from both sides 17, 19 (compression and rebound stage).

In relation to the spring characteristics of the two spring devices 8 and 9 configured as coil springs and the magnetic field deflection a characteristic damper curve corresponding to the desired conditions is thus generated.

The two spring devices 8 and 9 configured as coil springs preferably do not abut against the valve piston 11 but against preceding abutments 28 and 29 terminating at a distance of e.g. 0.1 mm in front of the valve piston 11.

Thus when no pressure is applied the valve piston 11 will always be in the neutral or normal position 16 and no—or only a minor—magneto-rheological effect is applied to the magneto-rheological fluid in the damping channel 6, 7 or gap.

Without the spring abutments 28, 29 in front of the piston the valve piston 11 would be displaced out of its normal position 16 in the case that the strength of the coil spring 8, 9 changes on one side (e.g. in the rebound stage) until the two springs 8, 9 have regained an equilibrium of forces, which would result in an unintended magneto-rheological effect and quasi in increased viscosity in the damping channel 6 or 7 in the normal position 16. The abutments 28, 29 prevent this while concurrently allowing different characteristics for the compression and rebound stages.

The characteristic curve may be varied by means of altering the spring bias. One adjustable spring seating pan 28 and 29 each for the spring on the left (e.g. rebound stage) and the right (compression stage) varies the spring length (biased length) such that in the case of contact with the piston the spring force will start at a different level. For setting the spring bias a number of nested shafts may be provided similar to conventional damper structures.

Springs having progressive characteristic curves may be employed as well. Or else, instead of one spring per side, two nested springs (double spring) having different spring characteristics and lengths may be used.

As shown in FIG. 5 illustrating an enlarged part of the damper piston 22 according to the FIGS. 1 to 3, the flow valve 5 is provided in a recess of the damper piston 22.

The damping channels 6 and 7 presently extend in the axial direction, forming flow channels 27 through which the magneto-rheological fluid can flow from the first damper chamber 2 to the second damper chamber 3 and back again.

The flow valve 5 illustrated in FIG. 5 in turn comprises on a first side 17 a first acting space 18 being in connection with the first damper chamber 2 and on a second side 19, a second acting space 20 in connection with the second damper chamber 3.

Inside the inner pipe 30 the permanent magnet 10 is positioned displaceable counter to the force of the spring devices 8 and 9. In FIG. 5 the permanent magnet 10 is shown displaced in the direction of the spring device 9 since the pressure is correspondingly high on the other side.

The flow valve 5 illustrated in FIG. 5 differs from the flow valve 5 in FIG. 4 among other things in that the damping channels 6 and 7 extend in the axial direction instead of the radial direction.

Furthermore the flow valve 5 according to FIG. 5 is basically simpler in structure than is the flow valve 5 according to FIG. 4. The outer pipe 35 is presently formed by the damper piston 22 which for this purpose consists at least in part or in portions of a magnetically conducting and in particular a ferromagnetic material to intentionally close the magnetic field in this place.

Other than the areas 31 no magnetic insulation 34 is required in this version. In the normal position 16 a magnetic short-circuit is generated over the magnetically conducting area 32 as it was described above.

In the case of deflection the magnetic flow flows across the magnetically conducting poles provided in the axial direction to both sides of the permanent magnet 10 and then radially over the inner pipe 30 and the axial flow channels 6 and 7, closing over the damper piston 22. Such a deflected position is shown in FIG. 5 where the permanent magnet 10 has been displaced from the normal position 16 to a deflected position 15 (compression stage). In this way the permanent magnet 10 is not completely magnetically short-circuited in the axial direction and the magnetic field influences the damping gaps 6 and 7 correspondingly.

In the case of a deflection of the permanent magnet 10 or the valve piston 11 the ferrous poles 42 at the axial permanent magnet poles of the permanent magnet 10 allow the magnetic flow across the insulating areas 31 to thus close the magnetic field.

Depending on the structural configuration the damping gaps 6 and 7, being one joint damping gap, may extend over the entire circumference of the flow valve 5.

In the version shown in FIG. 4, however, the magnetic field lines axially close across the radial flow channel or the radial flow channels 6 and 7 of the flow valve 5.

The invention claimed is:

1. A damping device for a two-wheeled vehicle, comprising:
    at least one first damper chamber and at least one second damper chamber which are coupled to one another through at least one flow connection;
    at least one flow valve positioned in the flow connection and including:
        at least one damping channel having a magneto-rheological fluid;
        at least one magnetic device configured to generate a magnetic field and being movable between a center position and at least one deflected position in said at least one flow valve, wherein at least a portion of said at least one damping channel can be exposed to the magnetic field; and
        at least one spring device, wherein movement of said at least one magnetic device from said center position to said at least one deflected position against a spring force generated by said at least one spring device exposes at least a portion of said at least one damping channel to said magnetic field, and wherein the effect of said magnetic field in said at least one damping channel is greater when said at least one magnetic device is in said at least one deflected position than in said center position.

2. The damping device according to claim 1, wherein said magnetic field of said at least one magnetic device is substantially magnetically short-circuited when said at least one magnetic device is in said center position.

3. The damping device according to claim 1, wherein said at least one magnetic device is configured as a permanent magnet or at least comprises a permanent magnet.

4. The damping device according to claim 1, wherein a first side of said at least one magnetic device is provided with a first acting space and a second side of said at least one magnetic device is provided with a second acting space and wherein said first acting space is coupled with said at least one first damper chamber and said second acting space coupled with said at least one second damper chamber.

5. The damping device according to claim 4, wherein a deflection force on said at least one magnetic device is dependent on a differential pressure of said fluid in said first and second acting spaces.

6. The damping device according to claim 4, wherein said first acting space is provided at a first internal recess of said at least one flow valve and said second acting space at a second internal recess of said at least one flow valve.

7. The damping device according to claim 4, wherein said first and second acting spaces are defined by an inner pipe in said at least one flow valve, said inner pipe being disposed in an area adjacent to said at least one magnetic device, said inner pipe including a magnetic insulation layer at opposing ends of said at least one magnetic device followed by magnetically conducting areas such that said inner pipe is magnetically conducting in said center position.

8. The damping device according to claim 7, wherein the inner pipe is surrounded by a magnetic insulator and a magnetically conducting outer pipe.

9. The damping device according to claim 7, wherein said at least one damping channel bypasses one axial end of said inner pipe.

10. The damping device according to claim 1, wherein said at least one first and second damper chambers are disposed in a damper and separated by means of a damper piston.

11. The damping device according to claim 10, wherein said at least one magnetic device is disposed in said damper piston.

12. The damping device according to claim 1, wherein said at least one magnetic device is axially displaceably in said at least one flow valve, and wherein said at least one magnetic device comprises a first axial end being a north pole and an opposing, second axial end being a south pole.

13. The damping device according to claim 1, wherein said at least one spring device is disposed in at least one acting space in said at least one flow valve and urging said at least one magnetic device from said at least one deflected position to said center position.

14. The damping device according to claim 1, further comprising an abutment in said at least one flow valve, wherein said at least one spring device exerts pressure against said abutment in said center position such that said at least one magnetic device is not loaded by said at least one spring device.

15. The damping device according to claim 1, wherein a mechanical control valve is provided which opens as a predetermined pressure is exceeded and which is in particular configured as a shim valve.

16. The damping device according to claim 1, wherein a heat pipe device is provided having at least one heat pipe for emitting heat generated in damping.

17. The damping device according to claim 16, wherein a cooling device is provided comprising the heat pipe and a convector unit and a reflux device wherein the convector unit emits the absorbed heat to the exterior.

18. The damping device according to claim 17, wherein the heat pipe device is formed on a control rod.

19. The damping device according to claim 16, wherein the heat pipe of the heat pipe device contains at least one heat medium and is filled with the heat medium such that the heat medium in the heat pipe is present substantially in a vapor state and substantially in a liquid state at least given a temperature between 20° C. and 60° C.

20. The damping device of claim 1, wherein said at least one flow valve includes a valve piston movable between a center position and at least one deflected position in said flow valve, said valve piston including said at least one magnetic device.

* * * * *